(12) United States Patent
Lungren et al.

(10) Patent No.: US 7,144,123 B2
(45) Date of Patent: Dec. 5, 2006

(54) SPACE OPTICS COVER AND EXTENDABLE BAFFLE FOR CONTAMINATION CONTROL

(76) Inventors: Mark A. Lungren, P.O. Box 3707, MC 13-08, Seattle, WA (US) 98124-2207; Henry K. Shu, P.O. Box 3707, MC 13-08, Seattle, WA (US) 98124-2207

( * ) Notice: Subject to any disclaimer, the term of this patent is extended or adjusted under 35 U.S.C. 154(b) by 58 days.

(21) Appl. No.: 10/410,495

(22) Filed: Apr. 9, 2003

(65) Prior Publication Data

US 2004/0201896 A1 Oct. 14, 2004

(51) Int. Cl.
*G02B 23/16* (2006.01)
*G03B 11/04* (2006.01)
n
(52) U.S. Cl. .................. 359/511; 359/601; 359/611; 359/612
(58) Field of Classification Search ........ 359/407–409, 359/511, 600, 601, 611, 612; 42/129, 143; 348/834–842; 396/448
See application file for complete search history.

(56) References Cited

U.S. PATENT DOCUMENTS

| | | | | | |
|---|---|---|---|---|---|
| 2,093,237 | A | * | 9/1937 | Dolecki | 88/1 |
| 3,526,352 | A | * | 9/1970 | Swett | 229/110 |
| 4,045,117 | A | * | 8/1977 | Lerner | 350/60 |
| 4,909,617 | A | * | 3/1990 | Boyd | 359/511 |

* cited by examiner

*Primary Examiner*—Drew A. Dunn
*Assistant Examiner*—Joshua L. Pritchett
(74) *Attorney, Agent, or Firm*—Chan Law Group LLP; Lisa A. Karczewski (57) ABSTRACT

The invention is a combination optics cover and extendable baffle. One version has at least one flap repositioned from a folded covering position to an extended baffle position. Each flap is repositioned to the extended position by a means for deployment when freed from a restraint implement. Another version has an inner baffle slideably encased axially within an outer baffle. The inner baffle is urged to telescope axially outward from a retracted position to a fully extended position by a deployment implement freed from a restraint implement. The abstract is submitted with the understanding that it will not be used to interpret or limit the scope or meaning of the claims. 37 CFR 1.72(b).

14 Claims, 7 Drawing Sheets

SPACE OPTICS COVER AND EXTENDABLE BAFFLE FOR CONTAMINATION CONTROL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF INVENTION

The present invention relates generally to the field of space optics and more particularly to a space optics cover and extendable baffle for space optics protection.

BACKGROUND OF THE INVENTION

Explosives used to separate covers during final shroud separation in space systems such as interceptors with optics create contamination residue. The contamination residue often deposits itself onto the optics of optical systems, degrading performance.

Two approaches to solving the contamination problem are currently in use. One solution mounts the optical systems "looking backward" away from the separation event. The biggest drawback to facing the optical system backwards is that it necessitates extra payload mass and volume. The extra mass and volume result in higher costs. The optical systems are typically much smaller than the vehicle onto which they are mounted. The optical system and the vehicle are located within the aerodynamic nose fairing. The optimal arrangement has the optical system located on top of the vehicle inside the tapering nose fairing. When the optical systems face backward it is located next to the vehicle and requires a much larger nose fairing than the optimal arrangement.

The second solution currently in practice places a deployable cover over the optical system. A drawback to this arrangement is that the cover deployment mechanism may create contamination or fail during the mission. Another drawback is the extra mass and volume added by the cover and the ancillary structure. Again, the extra mass and volume result in higher costs.

A collapsed baffle assembly and integrated cover that extends into a baffle during the mission is a solution. It decreases the complexity by lowering the number of parts while increasing reliability and decreasing contamination. It also reduces the mass and payload volume. This type of device is feasible since many types of space systems have folded parts that expand, like solar panels and antennas. The present invention satisfies these requirements, as well as others.

BRIEF SUMMARY OF THE INVENTION

The invention resides in an optics cover and extendable baffle. It includes at least one flap with a folded position and an extended position. Each flap uncovers the optics forming a baffle when in the extended position. A deployment implement repositions each flap from the folded position to the extended position. A restraint implement holds each flap in the folded position against the deployment implement. The release of the restraint implement allows the deployment implement to reposition each flap into the extended position.

In a variant of the invention, the at least one flap has a substantially cylindrical shape or a substantially conic shape when in the extended position.

In a further variant, the deployment implement is a biasing implement such as elastic bands, intrinsic springs, external springs, an inflatable device, clean gas, magnetic force or chemical energy.

In still a further variant of the invention, each flap is fabricated from a single material. The deployment implement is intrinsic to each flap when the size, shape and disposition of each flap along with its type of material produce an intrinsic biasing force. Each flap is preferably stamped from spring steel and formed to produce the shape. Alternatively, fabrication materials like steel, aluminum, titanium, copper, brass, plastic and composite and formed to produce the requisite shape is also suitable for each flap.

In another variant of the invention each flap is fabricated from a flexible web strung between a first stay and a second stay. The deployment implement is intrinsic to each stay when the size, shape and disposition of each stay along with its type of material produce an intrinsic biasing force. The baffle is made up of a plurality of stay-flexible web combinations arrayed circumferentially around the optics. A plurality of independent flaps or one interconnected flap can be formed from these stay-flexible web combinations. When each stay is in the folded position, they converge at the center of the optics eliminating the tension on the flexible web. The flexible web tends to bunch up and forms a cover over the optics. The flexible web is pulled tight when each stay and extends from the folded position. Production of the stay is a combination of fabrication materials, like steel, aluminum, titanium, copper, brass, plastic and composite formed into the requisite shape. Fabric is a satisfactory material for the flexible web.

In still another variant of the invention involves the circumferential array of each flap around the optics of an optical system. Each flap also has a base and a tip with each flap alternating circumferentially around the optics between tapering from the base to the tip and widening from the base to the tip.

In yet another variant of the invention, each flap is located sufficiently close to the optics of an optical system that each flap and covers the optics when in the folded position. Each flap uncovers the optics affording the optical system an unobstructed view when in the extended position.

In still a further variant of the invention, the restraint implement is a remotely releasable cord or a remotely releasable cloth stretched over the flap.

The invention also resides in a telescoping baffle. The telescoping baffle includes an outer baffle and an inner baffle. The outer baffle is a tube with a first and second end and a first inner diameter. The first end is affixed around the optics of an optical system. It extends outward from around the optics.

The inner baffle is a tube with a first and second end and a first outer diameter. The first outer diameter is less than the first inner diameter. The inner baffle is slideably encased axially within the outer baffle.

The inner baffle is urged to telescope axially outward from a retracted position to a fully extended position by a deployment implement.

The inner baffle is held in the retracted position by a restraint implement. The release of the restraint implement allows the deployment implement to drive the inner baffle axially outward into the extended position.

In a variation of this invention, the second end of the outer baffle has an internal ring detent positioned perpendicular to the central axis of the outer baffle. The internal ring detent has a second inner diameter. The second inner diameter is less than the first inner diameter. The first end of the inner baffle has an external ring detent perpendicular to the central axis of the inner baffle. The external ring detent has a second outer diameter. The first outer diameter is less than the second inner diameter. The second outer diameter is greater than the second inner diameter, but less than the first inner diameter. The internal ring detent impinges the external ring detent limiting the extension of the inner baffle.

A spring force, a magnetic force or a clean gas propulsion force, can power the deployment implement.

In another variation of this invention, the restraint implement is a remotely severable cover stretched across the inner baffle and the outer baffle. The inner baffle telescopes axially outward when the cover is severed. The cover is made from fabric.

The foregoing has outlined the more pertinent and important features of the present invention in order that the detailed description of the invention that follows may be better understood so the present contributions to the art may be more fully appreciated. Additional features of the present invention will be described hereinafter, which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only.

DETAILED DESCRIPTION

As shown in FIGS. 1–7, the invention resides in an optics cover and extendable baffle 10. It includes at least one flap 14 with a folded position 22 and an extended position 18. Each flap 14 uncovers the optics forming a baffle 10 when in the extended position 18. A deployment implement repositions each flap 14 from the folded position 22 to the extended position 18. A restraint implement 38 holds each flap 14 in the folded position 22 against the deployment implement. The release of the restraint implement 38 allows the deployment implement to reposition each flap 14 into the extended position 18.

In a variant of the invention, the at least one flap 14 has a substantially cylindrical shape or a substantially conic shape such as shape 15 when in the extended position 18.

In a further variant, the deployment implement is a biasing implement such as elastic bands, intrinsic springs, external springs, an inflatable device, clean gas, magnetic force or chemical energy.

In still a further variant of the invention, each flap 14 is fabricated from a single material. The deployment implement is intrinsic to each flap 14 when the size, shape and disposition of each flap 14 along with its type of material produce an intrinsic biasing force. Each flap is preferably stamped from spring steel and formed to produce the shape. Alternatively, fabrication materials like steel, aluminum, titanium, copper, brass, plastic and composite and formed to produce the requisite shape is also suitable for each flap 14.

Figure 1:
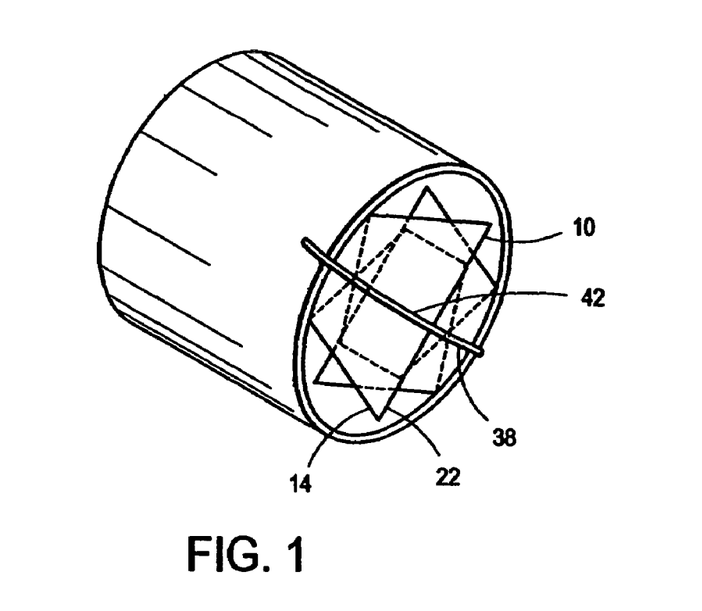
FIG. 1 is an orthogonal view of the baffle with folded one material flaps.
Figure 2:
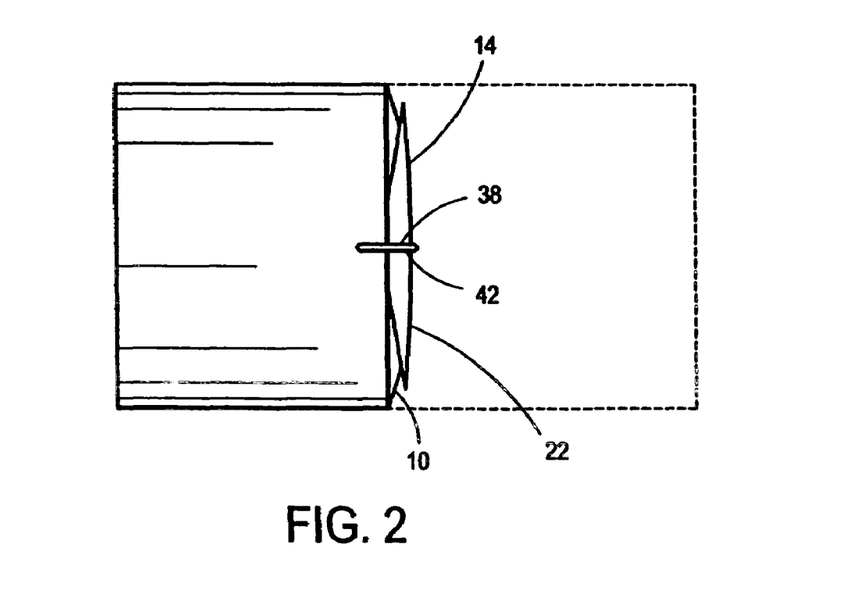
FIG. 2 is a side view of the baffle with folded one material flaps.
Figure 3:
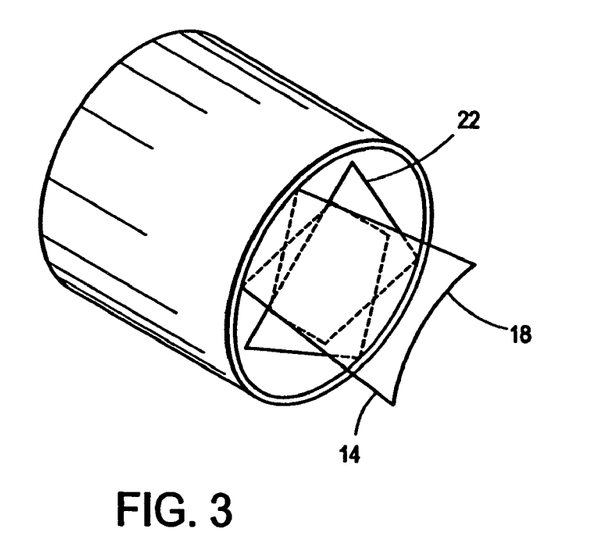
FIG. 3 is an orthogonal view of the baffle with a single extended one material flap.
Figure 4:
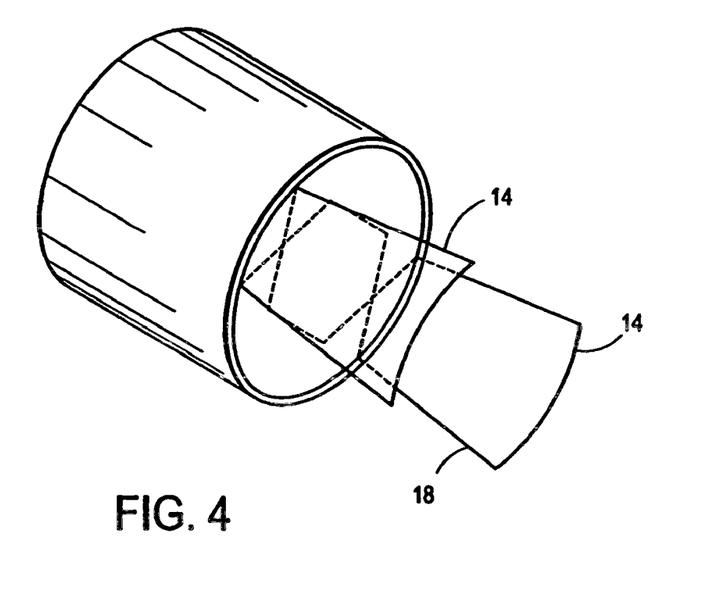
FIG. 4 is an orthogonal view of the baffle with a two extended one material flaps.
Figure 5:
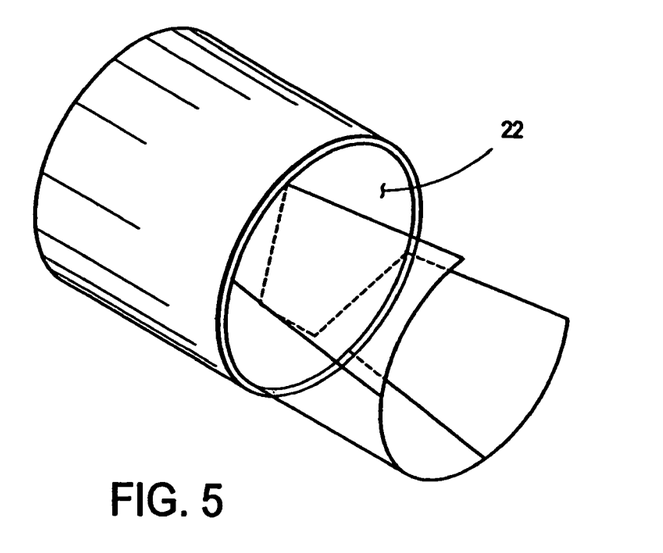
FIG. 5 is an orthogonal view of the baffle with a three extended one material flaps.
Figure 6:
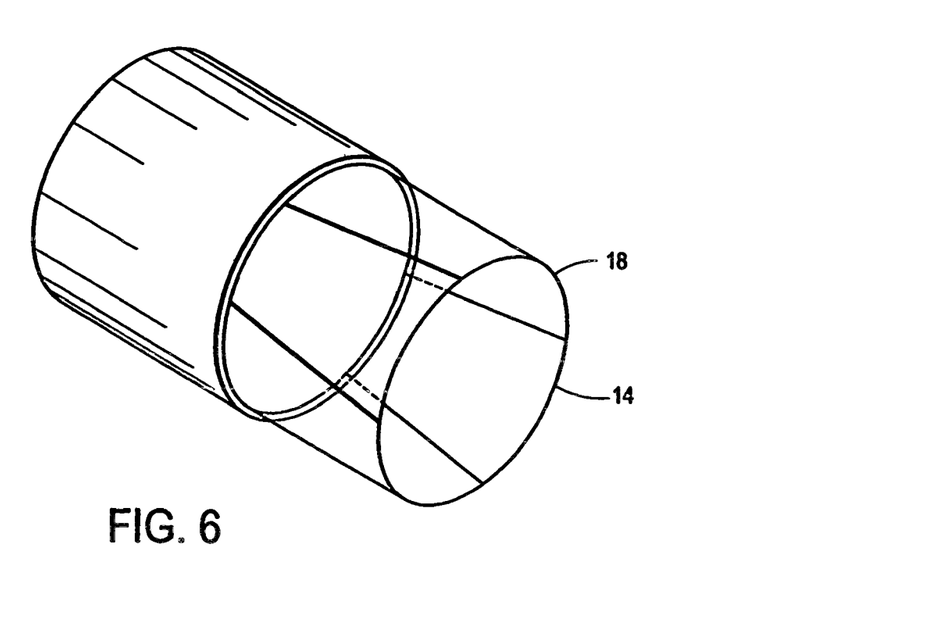
FIG. 6 is an orthogonal view of a fully extended one material flap baffle.
Figure 7:
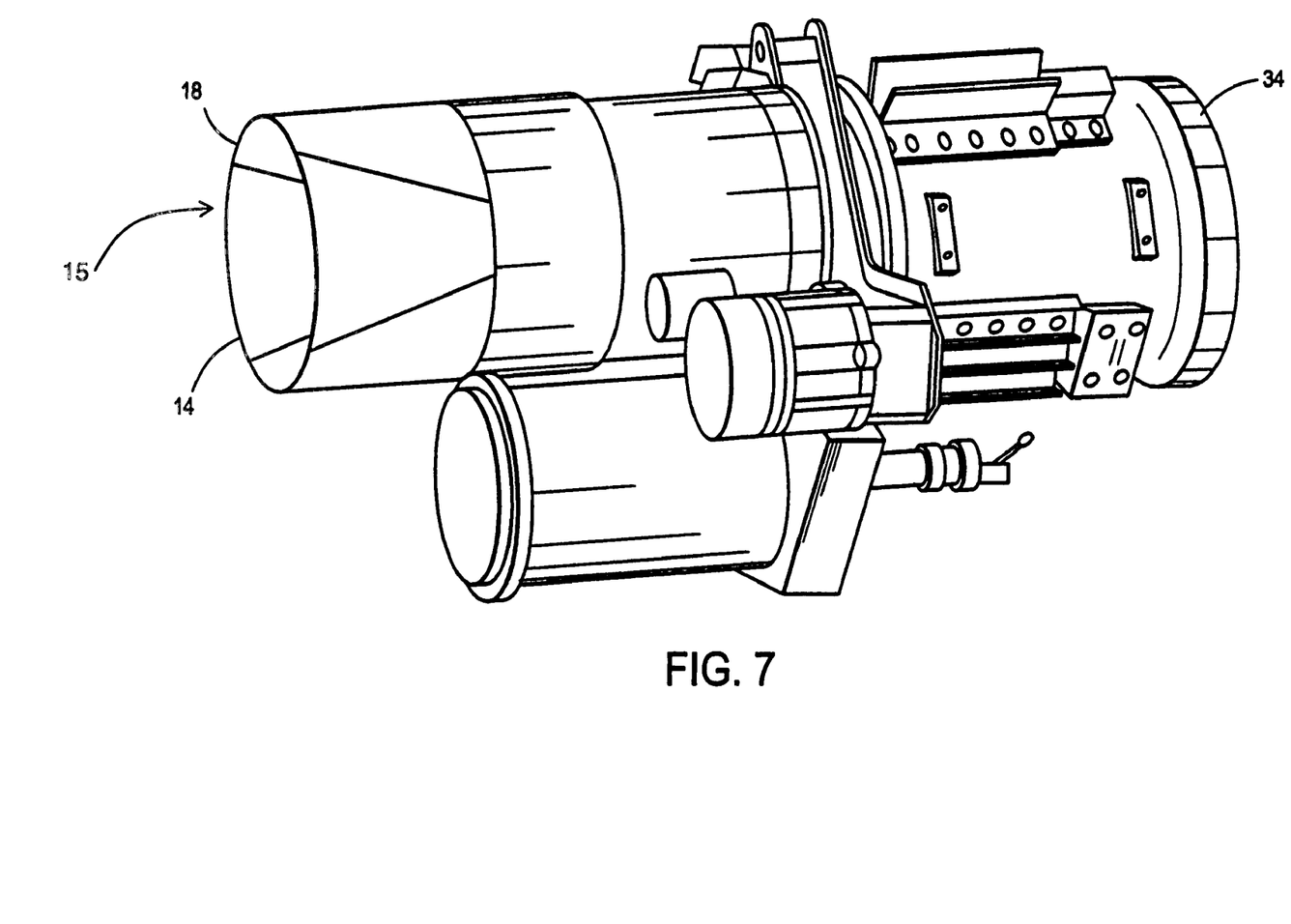
FIG. 7 is a perspective view of a fully extended one material flap baffle mounted upon an optical system.
Figure 8:
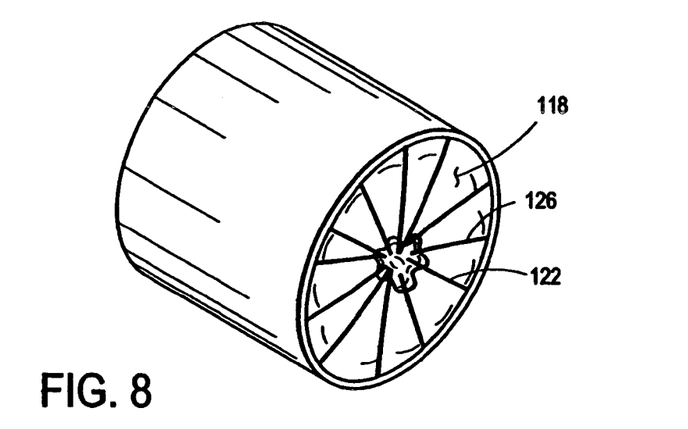
FIG. 8 is an orthogonal view of the baffle with folded flaps fabricated from a flexible web strung between a first stay and a second stay.
Figure 9:
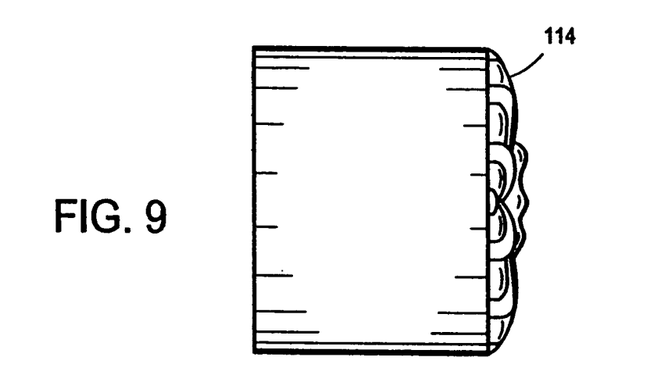
FIG. 9 is a side view of the baffle with folded flaps fabricated from a flexible web strung between a first stay and a second stay.
Figure 10:
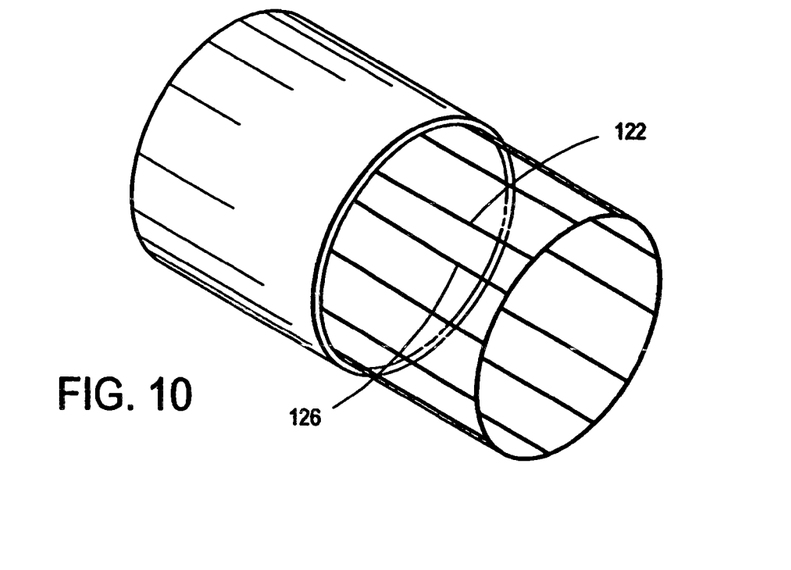
FIG. 10 is an orthogonal view of a fully extended baffle fabricated from a flexible web strung between a first stay and a second stay.

In another variant of the invention, shown in FIGS. 8–10, each flap 114 is fabricated from a flexible web 118 strung between a first stay 122 and a second stay 126. The deployment implement is intrinsic to each stay 122 and 126 when the size, shape and disposition of each stay 122 and 126 along with its type of material produce an intrinsic biasing force. The baffle is made up of a plurality of stay 126-flexible web 118 combinations arrayed circumferentially around the optics. A plurality of independent flaps or one interconnected flap can be formed from these stay 122 and 126-flexible web 118 combinations. When each stay 122 and 126 is in the folded position 130, they converge at the center of the optics eliminating the tension on the flexible web 118. The flexible web 118 tends to bunch up and forms a cover over the optics. The flexible web 118 is pulled tight when each stay 122 and 126 extends from the folded position 130. Production of the stay is a combination of fabrication materials, like steel, aluminum, titanium, copper, brass, plastic and composite formed into the requisite shape. Fabric is a satisfactory material for the flexible web.

In still another variant of the invention involves the circumferential array of each flap 14 and 114 around the optics of an optical system. Each flap 14 and 114 also has a base and a tip with each flap 14 and 114 alternating circumferentially around the optics between tapering from the base to the tip and widening from the base to the tip.

In yet another variant of the invention, each flap 14 and 114 is located sufficiently close to the optics of an optical system that each flap 14 and 114 covers the optics when in the folded position 22 and 130. Each flap 14 and 114 uncovers the optics affording the optical system an unobstructed view when in the extended position.

In still a further variant of the invention, the restraint implement 38 is a remotely releasable cord or a remotely releasable cloth stretched over the flap 14 and 114.

Figure 11:
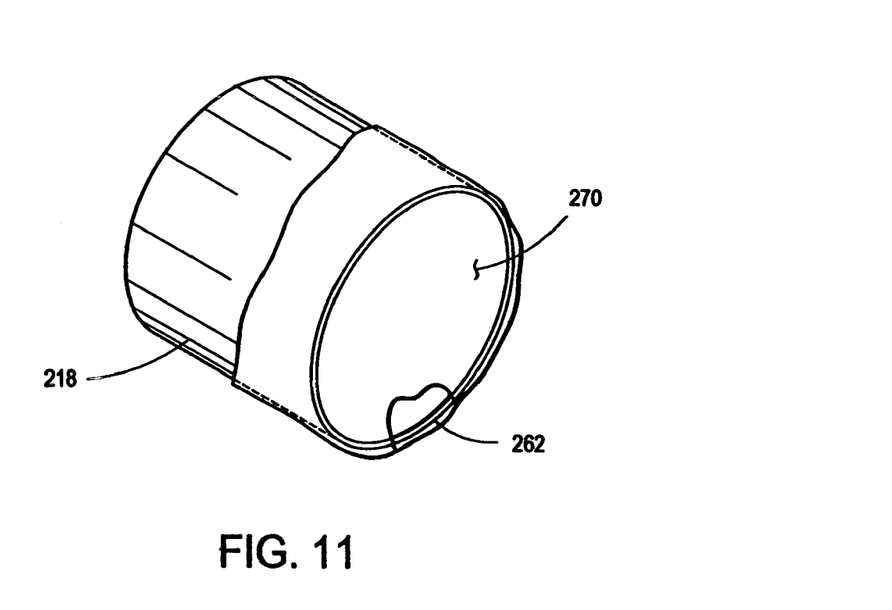
FIG. 11 is an orthogonal view of a stowed telescoping baffle with the inner baffle slideably encased within an outer baffle and held against extension be a cloth cover.
Figure 12:
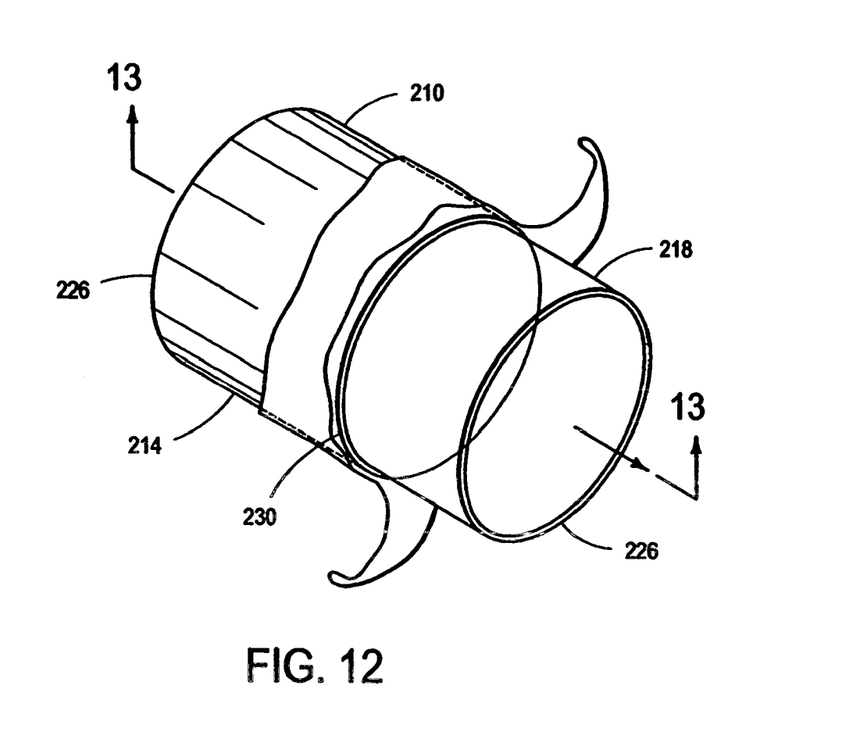
FIG. 12 is an orthogonal view of an extended telescoping baffle.
Figure 13:
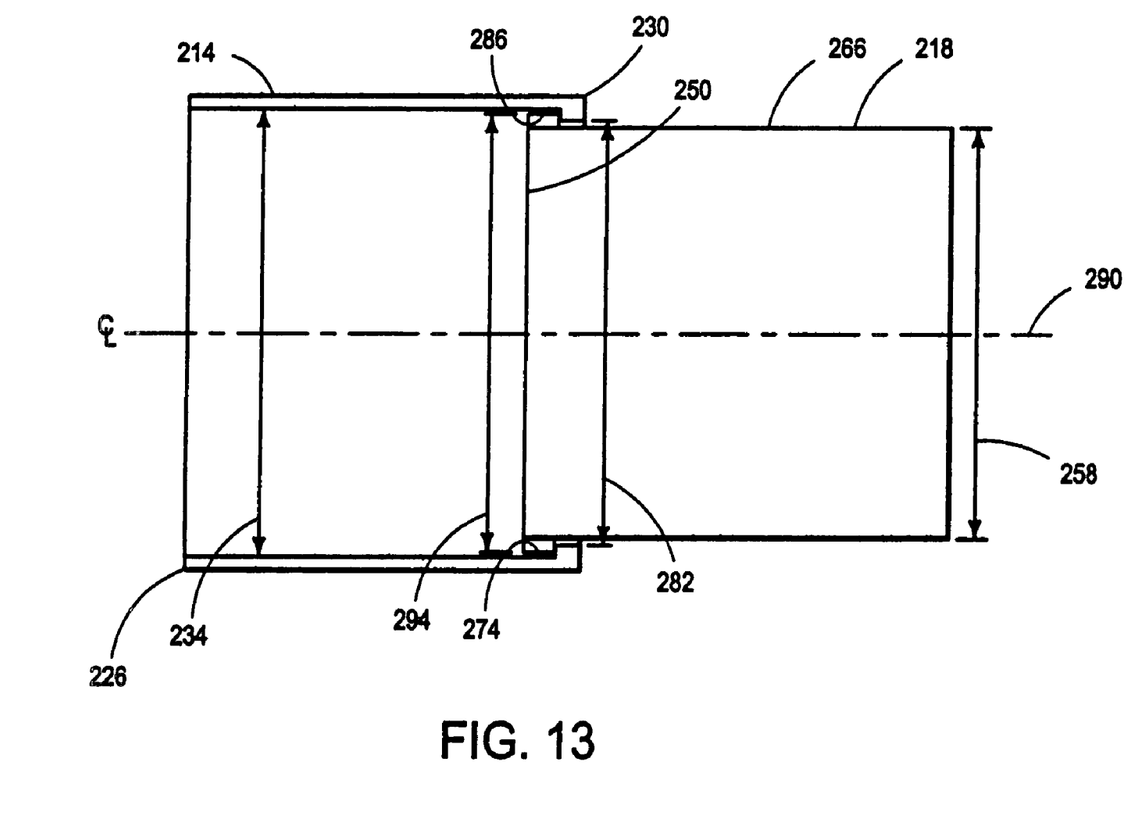
FIG. 13 is a section cut of an extended telescoping baffle.

As shown in FIGS. 11 through 13, the invention also resides in a telescoping baffle 210. The telescoping baffle 210 includes an inner baffle 218 slideably encased within an outer baffle 214. The outer baffle 222 is a tube with a first 226 and second end 230 and a first inner diameter 234. The first end 226 is affixed around the optics of an optical system. It extends outward from around the optics.

The inner baffle 218 is a tube with a first 250 and second end 254 and a first outer diameter 258. The first outer diameter 258 is less than the first inner diameter 234. The inner baffle 218 is slideably installed axially into the outer baffle 214.

The inner baffle 218 is urged to telescope axially outward from a retracted position 262 to a fully extended position 266 by a deployment implement.

The inner baffle 218 is held in the retracted position 262 by a restraint implement 270. The release of the restraint implement 270 allows the deployment implement to drive the inner baffle 218 axially outward into the extended position 266.

In a variation of this invention, the second end 230 of the outer baffle 214 has an internal ring detent 274 positioned perpendicular to the central axis 290 of the outer baffle 214, the internal ring detent 274 has a second inner diameter 282. The second inner diameter 282 is less than the first inner diameter 234. The first end 250 of the inner baffle 218 has an external ring detent 286 perpendicular to the central axis 290 of the inner baffle 218. The external ring detent 286 has a second outer diameter 294. The first outer diameter 258 is less than the second inner diameter 282. The second outer diameter 294 is greater than the second inner diameter 282, but less than the first inner diameter 234. The internal ring detent 274 impinges the external ring detent 286 limiting the extension of the inner baffle 218.

A spring force, a magnetic force or a clean gas propulsion force, can power the deployment implement.

In another variation of this invention, the restraint implement 270 is a remotely severable cover 298 stretched across the inner baffle 218 and the outer baffle 214. The inner baffle 218 telescopes axially outward when the cover 298 is severed. The cover 298 is made from fabric.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. An optics cover and extendable baffle for contamination control in space systems, comprising:
   a plurality of alternating up and down, independent flaps, each of said flaps having a folded position and an extended position, each of said flaps biased to said extended position and uncovers said optics forming a cylindrical baffle when in said extended position; and
   a releasable restraint implement for holding each of said flaps in said folded position against said bias.

2. An optics cover and extendable baffle according to claim 1 wherein the at least one said flap having a substantially cylindrical shape when in said extended position.

3. An optics cover and extendable baffle according to claim 1 wherein the at least one said flap having a substantially conic shape when in said extended position.

4. An optics cover and extendable baffle according to claim 1 wherein said flap is fabricated from a single material.

5. An optics cover and extendable baffle according to claim 4 wherein said flap is fabricated from the group of fabrication materials consisting of steel, aluminum, titanium, copper, brass, plastic and composite and formed to produce the requisite shape.

6. An optics cover and extendable baffle according to claim 1 further comprising a first stay, a second stay and a flexible web, said flap being fabricated from a flexible web strung between a first stay and a second stay, each said stay having an intrinsic bias to said extended position, a bunched said flexible web covers said optics when in said folded position.

7. An optics cover and extendable baffle according to claim 6 wherein said stay is fabricated from the group of fabrication materials consisting of steel, aluminum, titanium, copper, brass, plastic and composite and formed to produce the requisite shape.

8. An optics cover and extendable baffle according to claim 6 wherein said flexible web is made from fabric.

9. An optics cover and extendable baffle according to claim 1 wherein each said flap is arrayed circumferentially around the optics of an optical system.

10. An optics cover and extendable baffle according to claim 9 wherein each said flap having a base and a tip, each said flap alternating circumferentially around said optics between tapering from said base to said tip and widening from said base to said tip.

11. An optics cover and extendable baffle according to claim 1 wherein each said flap is located sufficiently close to the optics of an optical system that said flap covers said optics when in said folded position.

12. An optics cover and extendable baffle according to claim 1 wherein said flap uncovers said optics affording said optical system an unobstructed view when in said extended position.

13. An optics cover and extendable baffle according to claim 1 wherein said releasable restraint implement is a remotely releasable cord stretched over said flap.

14. An optics cover and extendable baffle according to claim 1 wherein said releasable restraint implement is a remotely releasable cloth stretched to cover said flap.

* * * * *

UNITED STATES PATENT AND TRADEMARK OFFICE
CERTIFICATE OF CORRECTION

| | |
|---|---|
| PATENT NO. | : 7,144,123 B2 |
| APPLICATION NO. | : 10/410495 |
| DATED | : December 5, 2006 |
| INVENTOR(S) | : Mark A. Lundgren and Henry K. Shu |

It is certified that error appears in the above-identified patent and that said Letters Patent is hereby corrected as shown below:

On title page,
Item (76) correct spelling of first inventor's name "Mark A. Lungren" to read -- Mark A. Lundgren --

Item (76) change address of inventor Mark A. Lundgren to read -- Fullerton, CA (US) --

Item (76) change address of inventor Henry K. Shu to read -- Laguna Niguel, CA (US) --

On the Title page,
Item (73) Please insert Assignee information to read -- The Boeing Company, Chicago, IL (US) --

Signed and Sealed this

Fourteenth Day of April, 2009

JOHN DOLL
*Acting Director of the United States Patent and Trademark Office*